United States Patent
Watanabe

(10) Patent No.: US 9,778,495 B2
(45) Date of Patent: Oct. 3, 2017

(54) TRANSLUCENT SINTERED BODY, A FARADAY ROTATOR MADE OF THIS SINTERED BODY, AND AN OPTICAL ISOLATOR

(71) Applicant: SHIN-ETSU CHEMICAL CO., LTD., Tokyo (JP)

(72) Inventor: Toshiaki Watanabe, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 195 days.

(21) Appl. No.: 14/534,907

(22) Filed: Nov. 6, 2014

(65) Prior Publication Data

US 2015/0131149 A1 May 14, 2015

(30) Foreign Application Priority Data

Nov. 11, 2013 (JP) ................. 2013-232751

(51) Int. Cl.
*G02F 1/09* (2006.01)
*H01S 3/00* (2006.01)
(Continued)

(52) U.S. Cl.
CPC ............ *G02F 1/093* (2013.01); *C04B 35/553* (2013.01); *G02B 1/00* (2013.01); *H01S 3/0064* (2013.01);
(Continued)

(58) Field of Classification Search
CPC .......... G02F 1/0036; G02F 1/09; G02F 1/093; G02F 1/0955; G02B 1/08; G02B 6/2746; G02B 27/286; Y10S 372/703; H01S 3/0064; H01S 5/0064; C04B 35/553; C04B 2235/3208; C04B 2235/3224; C04B 35/50; C04B 2235/9646–2235/9653

USPC ................ 359/280–284, 321, 324, 350, 352, 359/484.02–484.1; 372/703; 252/582, 252/584, 585, 588; 501/151, 152
See application file for complete search history.

(56) References Cited

U.S. PATENT DOCUMENTS

2011/0181950 A1    7/2011   Makikawa et al.
2013/0308187 A1 * 11/2013   Shimamura ............. C30B 15/00
                                                                359/484.03
(Continued)

FOREIGN PATENT DOCUMENTS

JP           2011-150208 A      8/2011
JP    WO 2012133200 A1 * 10/2012 ............. C30B 15/00
RU        2 484 187 C1      6/2013

OTHER PUBLICATIONS

Extended European Search Report dated Mar. 30, 2015, issued in counterpart European Patent Application No. 14192206.2 (7 pages).
(Continued)

*Primary Examiner* — Stephone B Allen
*Assistant Examiner* — James McGee
(74) *Attorney, Agent, or Firm* — Westerman, Hattori, Daniels & Adrian, LLP

(57) ABSTRACT

A translucent sintered body having the following basic composition:

$Ca_{(1-x)}Yb_xF_{(2+x)}$, where $0.4 \leq x \leq 1.0$, or preferably $Ca_{(1-x-y)}Yb_xR_yF_{(2+x+y)}$, $0.4 \leq x \leq 1.0$, $0 \leq y \leq 0.5$ wherein R is at least one element selected from Ce, Pr, Sm, Eu and Y.

6 Claims, 1 Drawing Sheet

(51) Int. Cl.
*C04B 35/553* (2006.01)
*G02B 1/00* (2006.01)

(52) U.S. Cl.
CPC .................. *C04B 2235/3208* (2013.01); *C04B 2235/3224* (2013.01)

(56) References Cited

U.S. PATENT DOCUMENTS

2014/0139910 A1* 5/2014 Gafsi ....................... G02B 1/11
359/352
2014/0239228 A1* 8/2014 Ishizawa ................. C01F 11/22
252/301.4 S

OTHER PUBLICATIONS

Extended European Search Report dated Apr. 16, 2015, issued in counterpart European Patent Application No. 14199971.4 (6 pages).

* cited by examiner

TRANSLUCENT SINTERED BODY, A FARADAY ROTATOR MADE OF THIS SINTERED BODY, AND AN OPTICAL ISOLATOR

PRIORITY CLAIMED

The present non-provisional application claims priority, as per Paris Convention, from Japanese Patent Application No. 2013-232751 filed on 2013 Nov. 11, the disclosure of which is hereby incorporated by reference herein in its entirety.

BACKGROUND OF THE INVENTION

Technical Field

The present invention relates to a sintered body having a high translucency and thus suitable to make a Faraday rotator used in optical communication and optical measurement, and the Faraday rotator made of this sintered body and the invention also relates to a Faraday rotator made of this sintered body and an optical isolate containing such Faraday rotator.

Background Technology

In the applications of optical communication and optical measurement, when a light emitted from a semiconductor laser returns to the semiconductor laser, as it is reflected by a surface of a member put in the transmission path, the laser oscillation is destabilized. In order to intercept this reflection return light, an optical isolator has been used wherein the Faraday rotator rotates the polarization plane in non-reciprocal manner.

The optical isolator, as shown in FIG. 2, is mainly constituted by a Faraday rotator 1, a pair of polarizers 2, 2, one installed on a beam entrance side and the other on a beam exit side of the Faraday rotator 1, a magnet 3, and a ring 4 made of a stainless steel. The material to make this Faraday rotator 1 needs to have a high Faraday effect and a high transmittance with respect to the light of a wavelength to be used with.

In order to cope with the recent demand for the isolator to be further down-sized, the thickness of the Faraday rotator 1 need be made smaller, and hence the material to make such a thinner Faraday rotator should have a smaller optical attenuation effect and a higher transmittance. Heretofore, to answer this purpose a sintered material such as ytterbium oxide ($Yb_2O_3$) has been used.

For example in IP Publication 1, there is a description to the effect that a transparent oxide which contains ytterbium oxide ($Yb_2O_3$) by 30 mass % or more has a relatively large Verdet constant and exhibits scarce light absorption with respect to the light of a wavelength of 320-800 nm, so that the material is a suitable choice for down-sizing a Faraday rotator of an optical isolator.

However, a problem is pointed out with respect to the conventional material described in IP Publication 1, which is that its transmittance sharply drops with respect to lights that have wavelengths of 400 nm or shorter. In particular, if a Faraday rotator is made of the conventional material, the transmittance of a light of 325 nm-wavelength turns 50% or lower; what is worse, the material scarcely transmits shorter-wavelength lights.

LIST OF PRIOR ARTS

IP Publications

[IP Publication 1] Japanese Patent Application Publication No. 2011-150208

BRIEF DESCRIPTION OF THE INVENTION

Problems the Invention Seeks to Solve

It is therefore an object of the present invention, in view of the above-described circumstances, to provide an optical isolator containing a Faraday rotator made of a highly translucent sintered body, which has high transmittance to the short-wavelength lights.

In order to attain this object, the present inventors studied hard and found that when fluoride $YbF_3$ is used as the Faraday rotator in place of the conventionally used oxide $Yb_2O_3$, the transmittance to the short-wavelength lights significantly improves, and this without causing the Verdet constant to depart from the desired values.

Means to Solve the Problem

In particular, the sintered body of the present invention is characteristic in having the following basic composition, and is excellent in translucency:

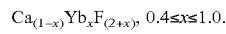

$Ca_{(1-x)}Yb_xF_{(2+x)}$, $0.4 \leq x \leq 1.0$.

The highly translucent sintered body of the present invention can contain one or more elements selected from Ce, Pr, Sm, Eu and Y in an amount represented by the following composition:

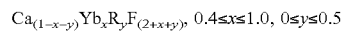

$Ca_{(1-x-y)}Yb_xR_yF_{(2+x+y)}$, $0.4 \leq x \leq 1.0$, $0 \leq y \leq 0.5$ wherein R is one or more elements selected from Ce, Pr, Sm, Eu and Y.

Furthermore, the sintered body of the present invention has an intensified transmittance of at least 60% for the lights of wavelength range of 140 nm through 450 nm, so that it is an excellent material to make the Faraday rotator of optical isolators.

Effects of the Invention

According to the present invention, the light transmittance is maintained high even when the lights are of short wavelengths, so that the sintered body of the present invention is excellent to make the Faraday rotator of the short wavelength light-type optical isolators, and it is therefore now possible to make an optical isolator which has a high transmittance irrespective of the wavelength range of the lights.

EXAMPLES EMBODYING THE INVENTION

Now, examples of the present invention will be explained, but these shall not be construed to limit the scope of the present invention.

The sintered body of the present invention basically comprises elements of Ca plus Yb plus F or Yb plus F in a manner as represented by the following formula:

$$Ca_{(1-x)}Yb_xF_{(2+x)}, 0.4 \leq x \leq 1.0.$$

The sintered body of the present invention may further include one or more of elements Ce, Pr, Sm, Eu, and Y in a manner as represented by the following formula:

$$Ca_{(1-x-y)}Yb_xR_yF_{(2+x+y)}, 0.4 \leq x \leq 1.0, 0 \leq y \leq 0.5$$

wherein R is one or more elements selected from Ce, Pr, Sm, Eu and Y.

The sintered body of the present invention has an intensified transmittance of at least 60% for the lights of wavelength range of 140 nm through 450 nm, and in the case where one or more of the elements Ce, Pr, Sm, Eu, and Y is contained, it exhibits a transmittance of 70% or higher. Also, the sintered body of the present invention can secure high Verdet constant as well as excellent translucency so that it is a favorable material to make the Faraday rotator of optical isolators which are used in the applications of optical communication and optical measurement, since such an optical isolator using a Faraday rotator made of this sintered body can exhibits a high transmittance over a wide range of wavelength bands.

EXAMPLES

We will now describe examples of the present invention.

Example 1

Aqueous solution of calcium fluoride (CaF2) and aqueous solution of ytterbium fluoride are mixed together in ratios of 0.4:0.6, 0.5:0.5, 0.4:0.6, 0.2:0.8, and 0.0:1.0, respectively, and to each of these acetic acid was dripped to cause precipitation, and the precipitate was dried, whereby powdery fluorides of the above ratios were obtained. Then, these powders were molded by being pressed in a die, and were heated at temperatures of 700 through 1300 degrees C., and a sintered body having a relative density of 95% or higher was manufactured.

This sintered body was subjected to a hot isotropic pressure (HIP) sintering in an inert atmosphere such as argon or nitrogen under a pressure of 500 through 3000 kg/cm2 at a temperature of 1000 through 1300 degrees C., whereby a translucent sintered body having a relative density of 99% or higher was manufactured.

Figure 1:
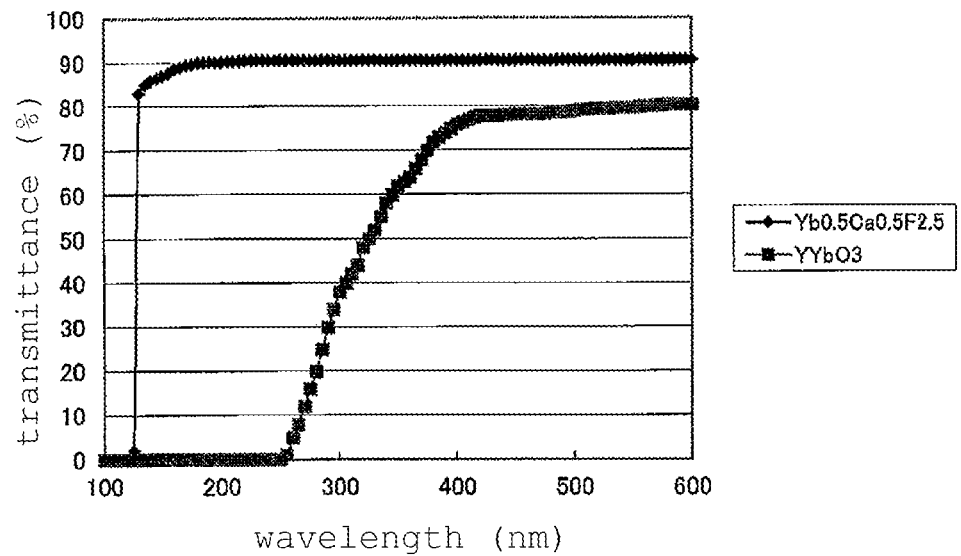
FIG. 1 is a graph to show a relationship between the wavelengths of $Ca_{0.5}Yb_{0.5}F_{2.5}$ and $YbYO_3$ on the horizontal axis and the transmittance thereof on the vertical axis.
Figure 2:
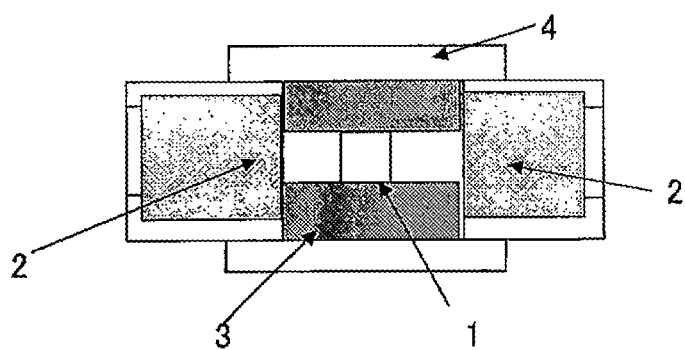
FIG. 2 is a schematic drawing showing the structure of an optical isolator.

Then, this translucent sintered body was shaped into a body of 5 mm in outer diameter and 4 mm in thickness, and the both circular faces were polished; the measurements were conducted for transmittance and Verdet constant in the instances of wavelengths of 325 m and 194 nm, respectively, and results were as shown in Table 1. Incidentally, in Table 1, the ratio of F is not entered among the composition ratios. Also, with respect to $Ca_{0.5}Yb_{0.5}F_{2.5}$, a transmission spectrum measurement was conducted and the result is as shown FIG. 1.

TABLE 1

| Composition | | | Optical Characteristics | | | |
| --- | --- | --- | --- | --- | --- | --- |
| | | | Transmittance (%) | | Verdet constant [min/(Oe · cm)] | |
| Ca 1 − x − y | Yb x | R y | 325 nm | 194 nm | 325 nm | 194 nm |
| 0.6 | 0.4 | 0.0 | 90 | 90 | 0.21 | 0.62 |
| 0.5 | 0.5 | 0.0 | 90 | 90 | 0.23 | 0.73 |
| 0.4 | 0.6 | 0.0 | 89 | 87 | 0.32 | 0.98 |
| 0.2 | 0.8 | 0.0 | 87 | 86 | 0.43 | 1.32 |
| 0.0 | 1.0 | 0.0 | 76 | 70 | 0.55 | 1.67 |

From the results shown in Table 1, it is seen that the transmittance was in any instance 70% or higher with respect to the light wavelengths of 325 nm and 194 nm; and in cases where Ca is contained the transmittance was in any instance 86% or higher and the Verdet constant was large enough.

Comparative Example 1

Oxide single crystal bodies were made by FZ method which had a composition such that the ratio of $Yb_2O_3$:$Y_2O_3$ was 50:50 and 60:40; then they were machined to the same dimensions as in the case of Example 1, and when the transmittance was measured of them with respect to light wavelengths of 325 nm and 194 nm and in the case of 325 nm the Verdet constant was also measured. Table 2 shows the results. With respect to the sample of 50:50 ratio, a transmission spectrum measurement was also conducted and the result is as shown FIG. 1.

TABLE 2

| Composition | | Transmittance (%) | | Verdet constant [min/(Oe · cm)] | |
| --- | --- | --- | --- | --- | --- |
| $Yb_2O_3$ X | $Y_2O_3$ y | 325 nm | 194 nm | 325 nm | 194 nm |
| 0.5 | 0.5 | 50 | <1 | 0.24 | *** |
| 0.6 | 0.4 | 48 | <1 | 0.32 | *** |

*** transmittance was too low for measurement of Verdet constant

From the results shown in Table 2, it is seen that in Comparative Example 1, the transmittance was in any instance 50% or lower with respect to the light wavelength of 325 nm. In the case of 195 nm, the transmittance was too low to allow measurement of the Verdet constant.

Example 2

Employing the same procedure as described in Example 1, a powder was obtained, which was a mixture of calcium fluoride ($CaF_2$), ytterbium fluoride and rare earth fluorides. This powder was molded by being pressed in a die, and was heated at temperatures of 700 through 1300 degrees C., and a sintered body having a relative density of 95% or higher was manufactured.

This sintered body was subjected to a hot isotropic pressure (HIP) sintering in an inert atmosphere such as argon or nitrogen under a pressure of 500 through 3000 kg/cm2 at a temperature of 1000 through 1300 degrees C., whereby a translucent sintered body having a relative density of 99% or higher was manufactured.

Then, this translucent sintered body was shaped into a body of 5 mm in outer diameter and 4 mm in thickness, and the both circular faces were polished; the measurements were conducted for transmittance and Verdet constant in the instances of wavelengths of 325 m and 194 nm, respectively, and results were as shown in Table 3. Also in Table 3, the ratio of F is not entered among the composition ratios. Also, with respect to $Ca_{0.5}Y_{0.5}F_{2.5}$, a transmission spectrum measurement was conducted and the result is as shown FIG. 3.

TABLE 3

| Composition | | | Optical Characteristics | | | |
|---|---|---|---|---|---|---|
| | | | Transmittance (%) | | Verdet constant [min/(Oe · cm)] | |
| Ca | Yb | R | | | | |
| 1 − x − y | x | y | 325 nm | 194 nm | 325 nm | 194 nm |
| 0.10 | 0.5 | Y 0.4 | 89 | 88 | 0.24 | 0.74 |
| 0.20 | 0.6 | Y 0.2 | 86 | 86 | 0.31 | 0.94 |
| 0.20 | 0.7 | Ce 0.1 | 86 | 84 | 0.40 | 1.15 |
| 0.25 | 0.6 | Pr 0.15 | 88 | 88 | 0.26 | 0.78 |
| 0.20 | 0.6 | Eu 0.2 | 84 | 84 | 0.28 | 1.00 |
| 0.20 | 0.5 | Sm 0.3 | 86 | 86 | 0.24 | 0.76 |
| 0.00 | 0.5 | Sm 0.5 | 88 | 88 | 0.23 | 0.72 |

From the results shown in Table 3, it was confirmed that it was possible to obtain materials of which the transmittance was 84% or higher with respect to the light wavelengths of 325 nm and 194 nm and of which the Verdet constant was large enough.

Example 3

The sintered body $Ca_{0.2}Yb_{0.3}F_{2.8}$ obtained in Example 1 was shaped into a body of 5 mm in outer diameter and 5.2 mm in thickness, and the both circular faces were polished and coated with a 325 nm-thick air-resistive AR (antireflection) layer; the thus prepared piece was put within the magnet to construct a Faraday rotator. Then the insertion loss and the extinction ratio were measured of this Faraday rotator, and they were 0.2 dB and 35 dB, respectively, which are considered excellent.

On either end of the magnet a Glan-Thompson prism made of $MgF_2$ (insertion loss 0.5 dB; extinction ratio 48 dB) was set and fixed in a manner such that the relative angle was 45 degrees, and thus an optical isolator was constructed. Then this optical isolator was measured for the insertion loss and it was found that the forward direction insertion loss was 1.2 dB and the reverse direction loss was 32.5 dB, which are excellent for an optical isolator.

Example 4

The sintered body $Ca_{0.2}Yb_{0.3}F_{2.8}$ obtained in Example 1 was shaped into a body of 5 mm in outer diameter and 2.0 mm in thickness, and the both circular faces were polished and coated with a 194 nm-thick air-resistive AR layer; the thus prepared piece was put within the magnet to construct a Faraday rotator. Then the insertion loss and the extinction ratio were measured of this Faraday rotator, and they were 0.3 dB and 33 dB, respectively, which are considered excellent.

On either end of the magnet a Glan-Thompson prism made of $MgF_2$ (insertion loss 0.65 dB; extinction ratio 45 dB) was set and fixed in a manner such that the relative angle was 45 degrees, and thus an optical isolator was constructed. Then this optical isolator was measured for the insertion loss and it was found that the forward direction insertion loss was 1.6 dB and the reverse direction loss was 31.2 dB, which are excellent for an optical isolator.

REPRESENTATION OF REFERENCE NUMERALS

1: Faraday rotator
2: polarizer (Glan-Thompson)
3: magnet
4: stainless steel ring

What is claimed is:

1. A translucent sintered body comprising a composition represented by the following formula:

$Ca_{(1-x-y)}Yb_xR_yF_{(2+x+y)}$, 0.4<x≤1.0, 0<y≤0.5, 0.1≤1−x−y, wherein R is at least one element selected from Ce, Pr, Sm, Eu and Y.

2. A translucent sintered body as claimed in claim 1, having a transmittance of 60% or higher with respect to the lights of wavelength range of 140 nm through 450 nm.

3. A Faraday rotator comprising a translucent sintered body according to claim 1.

4. A Faraday rotator comprising a translucent sintered body according to claim 2.

5. An optical isolator comprising a Faraday rotator of claim 3.

6. An optical isolator comprising a Faraday rotator of claim 4.

* * * * *